Figure 1:
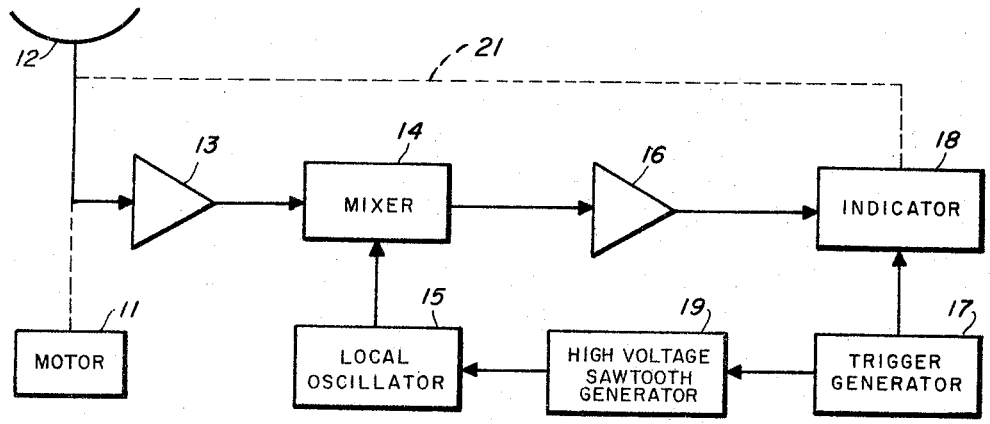

May 16, 1967

C. C. KUHNS ETAL 3,320,537

INTERCEPT RECEIVER FOR INDICATING AZIMUTH
AND FREQUENCY OF DETECTED SIGNALS

Filed July 16, 1963

INVENTORS
CHARLES C. KUHNS
VIRGIL O. SMITH

BY

*Paul U. Critchler*

ATTORNEYS

United States Patent Office 3,320,537
Patented May 16, 1967

3,320,537
INTERCEPT RECEIVER FOR INDICATING AZIMUTH AND FREQUENCY OF DETECTED SIGNALS
Charles C. Kuhns, San Diego, and Virgil O. Smith, La Mesa, Calif., assignors to the United States of America as represented by the Secretary of the Navy
Filed July 16, 1963, Ser. No. 295,570
3 Claims. (Cl. 325—336)

The invention described herein may be manufactured and used by or for the Government of the United States of America for governmental purposes without the payment of any royalties thereon or therefor.

The present invention relates to an intercept receiver and more particularly to an intercept receiver in which tuning is electronically varied periodically throughout a frequency band.

Prior art intercept receivers for detecting the presence of radar signals, for example, are either fixed tuned to a particular frequency within a band or are manually tunable over a predetermined range of frequencies. If a directional receiving antenna is utilized with the intercept receiver, this involves a very slow and tedious process of varying the receiver tuning for each sector of azimuth the antenna covers. Further disadvantages lie in the indicating system which for most prior art receivers is a special pulse analyzer that does not indicate frequency automatically, but the frequency must be read from the tuning dial.

According to the invention, an intercept receiver is provided which utilizes an electronically tunable local oscillator over a wide band of frequencies. An ordinary radar antenna may be utilized in conjunction with the receiver and available P.P.I. indicators may be utilized to indicate both azimuth and frequency of any intercepted signals. The azimuth is indicated in a conventional manner i.e. the indicator trace being rotated in conjunction with the radar antenna. Frequency can be indicated as a direct function of range on the P.P.I. indicator by varying the frequency of the intercept receiver local oscillator in accordance with a sawtooth function, and synchronizing the sweeps of the P.P.I. indicator with the sweeps of the local oscillator frequency. Hence, frequency will be indicated directly as a range on the indicator together with azimuth in the conventional manner.

It is thus an object of the present invention to provide an intercept receiver which is compatible with existing radar components.

Another object is a provision of an intercept receiver which is electronically tuned periodically over a wide frequency range.

A further object of the invention is to provide an intercept receiver which can be effectively utilized with an existing radar antenna.

Still another object is a provision of an intercept receiver which can be effectively utilized with existing radar P.P.I. indicators to indicate both azimuth and frequency of an intercepted signal.

A still further object of the invention is to provide an improved intercept receiver which is simple, inexpensive and requires a minimum of maintenance and adjustment.

Figure 2:
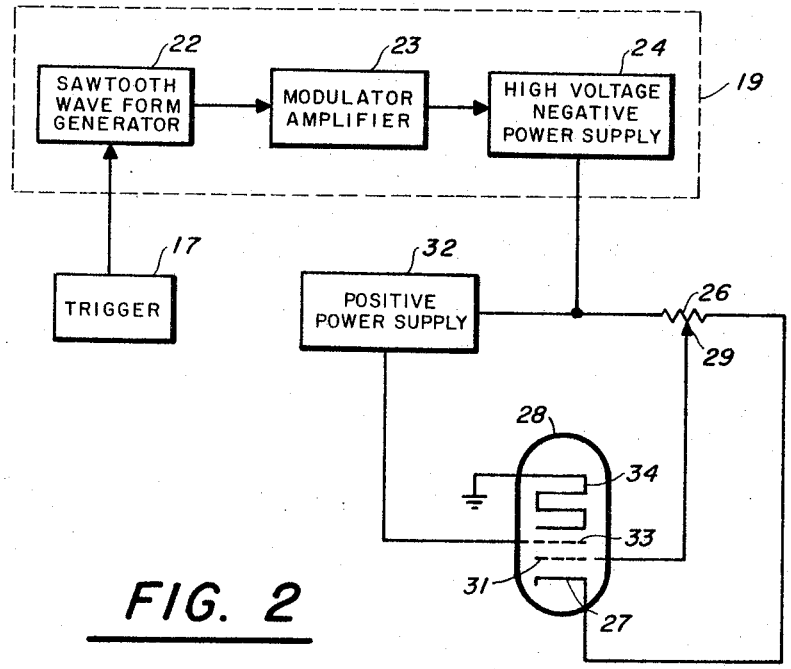

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 1 is a block diagram of an entire system utilizing the present invention; and FIG. 2 is a block diagram illustrating a further breakdown of the local oscillator section of FIG. 1.

Referring to FIG. 1 antenna 12, which can be a radar antenna, is coupled to amplifier 13, amplifier 13 is a wide band amplifier such as the type utilizing a traveling wave tube. The output of amplifier 13 is coupled to mixer 14. The output of mixer 14 is coupled to amplifier 16 and hence to indicator 18. Trigger 17 is coupled to indicator 18 and also to a high voltage sawtooth generator 19, the output of which is coupled to local oscillator 15. The output of local oscillator 15 is coupled to mixer 14. Antenna 12 is coupled to indicator 18, as shown by dotted lines 21.

Referring to FIG. 2 high voltage sawtooth generator 19 is broken down further into the blocks shown within the dotted lines indicated at 19. Sawtooth waveform generator 22 is triggered by trigger 17 and the output amplified in modulator amplifier 23, after which it is applied to high voltage negative power supply 24. High voltage negative power supply 24 is then coupled through resistance 26 to cathode 27 of backward wave oscillator tube 28. Sliding contact 29 on resistance 26 is connected to control grid 31. Positive power supply 32 is connected between the output of high voltage negative power supply 24 and anode 33. Delay line 34 is connected to ground.

*Operation*

Referring back to FIG. 1, radar antenna 12 is positioned or scanning at a rate determined by motor 11. This position is transferred either mechanically or electrically to P.P.I. indicator 18 by dotted lines 21, which in the conventional fashion can position the yoke of P.P.I. indicator 18 to indicate the azimuth bearing of antenna 12. Trigger generator 17 is free running, and puts out a series of triggers at a frequency of 250 cycles per second, for example. These triggers serve to trigger the sweep of P.P.I. indicator 18 and the high voltage sawtooth generator 19. The output of the high voltage sawtooth generator 19 is then applied to local oscillator 15 which causes its frequency to shift according to a sawtooth function in synchronization with the sweep of P.P.I. indicator 18. Local oscillator 15 can be any voltage-frequency responsive oscillator such as a backward wave oscillator or a Klystron oscillator, for example. If a signal within the frequency range of the equipment, for example in the x band, is received at antenna 12, it is then amplified in wide band amplifier 13 and passed to mixer 14. Wide band amplifier 13 can be a traveling wave to be amplified, for example, with a pass band of 50,000 megacycles to allow fast build-up of a received signal. This signal is then mixed with the output from the local oscillator 15 which is being swept at 250 cycles per second over a 200 megacycle range. The output of mixer 14 is then passed through IF amplifier 16 to P.P.I. indicator 18. It can be seen that only when the difference frequency or when the output of mixer 14 is within the narrow band pass of IF amplifier 16 will amplifier 16 wield an output for display on P.P.I. indicator 18. Hence, the position of the target from the center of P.P.I. indicator 18 will bear a direct relation to the frequency of the intercepted signal due to the synchronization of the sweep in P.P.I. indicator 18 and the sawtooth from high voltage sawtooth generator 19. This can be directly correlated in miles. For example, if P.P.I. indicator 18 is on a 200 mile scale and local oscillator 15 is being swept through a 200 megacycle range, a target or a blip appearing on P.P.I. indicator 18 at the 50 mile range indicator will indicate an incoming signal having a frequency of 50 megacycles over the minimum frequency through which local oscillator 15 sweeps, plus or minus the IF frequency. This is assuming that the sweep of local oscillator 15 is of a low frequency to a high frequency. If the reverse is true a subtraction of 50 megacycles would be indicated in this example.

Referring to FIG. 2 the high voltage sawtooth generator 19 is further broken down and local oscillator 15 is shown as a backward wave oscillator. Here again trigger 17 initiates a sawtooth waveform taken from sawtooth waveform generator 22 which is amplified in modulator amplifier 23 and passed to negative high voltage power supply 24. Negative high voltage power supply 24, in this embodiment, will put out a sweeping voltage from −600 to −1300. This can be accomplished by passing the output from modulator amplifier 23 to the control grid of a series or parallel regulator tube, for example. The output of negative high voltage power supply 24 will be a positive going sawtooth from a −600 to −1300 volts at a frequency dependent upon the frequency of trigger 17. This is applied via cathode resistor 26 to the cathode 27 and control grid 31 of backward wave oscillator tube 28. Anode voltage for anode 33 is supplied through a 250 volt voltage power supply 32 which is merely added in series with the output of negative high voltage power supply 24. This places anode 33 at 250 volts positive with respect to control grid 31 and cathode 27 minus the voltage drops across resistance 26. Sliding contact 29 allows for a bias adjustment on traveling wave tube 28.

It should be understood, of course, that the foregoing relates to only a preferred embodiment of the invention and that it is intended to cover all changes and modifications of the example of the invention herein chosen for the purposes of the disclosure which do not constitute departures from the spirit and scope of the invention.

What is claimed is:
1. An intercept receiver comprising:
   a directional antenna having an azimuth drive;
   a mixer having first and second inputs and an output, said antenna coupled to said first input;
   a local oscillator having a frequency control input and an output, said output connected to said mixer second input;
   control means for periodically and automatically sweeping said local oscillator frequency connected to said frequency control input;
   indicating means connected to said azimuth drive said control means, and said mixer output for indicating the presence, azimuth and frequency of any detected signal.
2. The intercept receiver of claim 1 wherein said local oscillator comprises a backward wave oscillator.
3. The intercept receiver of claim 2 wherein said control means comprises a sawtooth waveform generator.

References Cited by the Examiner
UNITED STATES PATENTS
2,498,954   2/1950   Heller _____ 325—335

KATHLEEN H. CLAFFY, *Primary Examiner.*

R. S. BELL, *Examiner.*